(12) United States Patent
Bourgeault et al.

(10) Patent No.: US 10,175,734 B1
(45) Date of Patent: Jan. 8, 2019

(54) TECHNIQUES FOR ADJUSTING LATENCY OF A CLOCK SIGNAL TO AFFECT SUPPLY VOLTAGE

(71) Applicant: Altera Corporation, San Jose, CA (US)

(72) Inventors: Mark Bourgeault, Mississauga (CA); Gurvinder Tiwana, Brampton (CA)

(73) Assignee: Altera Corporation, San Jose, CA (US)

( * ) Notice: Subject to any disclaimer, the term of this patent is extended or adjusted under 35 U.S.C. 154(b) by 244 days.

(21) Appl. No.: 15/185,484

(22) Filed: Jun. 17, 2016

(51) Int. Cl.
| | |
|---|---|
| *G06F 1/04* | (2006.01) |
| *G06F 1/10* | (2006.01) |
| *G06F 1/12* | (2006.01) |
| *G06F 1/26* | (2006.01) |
| *G06F 1/32* | (2006.01) |
| *G06F 9/30* | (2018.01) |

(52) U.S. Cl.
CPC ............ *G06F 1/26* (2013.01); *G06F 1/12* (2013.01); *G06F 9/30072* (2013.01); *G06F 1/04* (2013.01); *G06F 1/10* (2013.01); *G06F 1/3234* (2013.01)

(58) Field of Classification Search
CPC ..... G06F 1/12; G06F 1/10; G06F 1/04; G06F 1/3234; G06F 1/26; G06F 9/30072
USPC ................ 713/300, 400, 500, 600
See application file for complete search history.

(56) References Cited

U.S. PATENT DOCUMENTS

| | | | |
|---|---|---|---|
| 6,586,971 B1 * | 7/2003 | Naffziger ............. | G06F 1/10 327/41 |
| 6,609,228 B1 | 8/2003 | Bergeron et al. | |
| 7,210,115 B1 | 4/2007 | Rahim et al. | |
| 7,225,349 B2 | 5/2007 | Tam et al. | |
| 7,814,252 B2 * | 10/2010 | Hoshaku ............. | G06F 1/3203 710/240 |
| 9,634,676 B2 * | 4/2017 | Swaminathan ........ | H03L 7/099 |
| 2005/0022042 A1 * | 1/2005 | Tam ................... | G06F 1/04 713/323 |
| 2005/0138588 A1 | 6/2005 | Frenkil | |
| 2006/0056257 A1 * | 3/2006 | Origasa ............... | G11C 11/406 365/222 |
| 2006/0123256 A1 * | 6/2006 | Cornelius ............. | G06F 1/305 713/300 |
| 2006/0232316 A1 * | 10/2006 | Nomura .............. | G06F 1/10 327/291 |
| 2009/0085552 A1 | 4/2009 | Franza et al. | |
| 2009/0183019 A1 * | 7/2009 | Allen ................. | G06F 1/10 713/503 |
| 2012/0187991 A1 * | 7/2012 | Sathe ................. | H03K 5/135 327/158 |
| 2013/0049828 A1 * | 2/2013 | Kim .................. | G06F 1/26 327/146 |

(Continued)

*Primary Examiner* — Ji H Bae
(74) *Attorney, Agent, or Firm* — Steven J. Cahill (57) ABSTRACT

An integrated circuit includes circuit blocks, a clock network coupled to the circuit blocks, and a supply voltage network coupled to the circuit blocks. Each of the circuit blocks comprises at least one clocked circuit that receives a clock signal. The clock network provides the clock signal to the clocked circuits in the circuit blocks. The supply voltage network provides a supply voltage to the circuit blocks. A latency of the clock signal provided through the clock network to at least one of the circuit blocks is adjusted to decrease a peak voltage drop in the supply voltage caused by a peak current drawn by the circuit blocks.

20 Claims, 5 Drawing Sheets

(56) References Cited

U.S. PATENT DOCUMENTS

2015/0002197 A1* 1/2015 Chatterjee ............... H03L 7/095
327/159
2016/0043707 A1* 2/2016 Bhatia ..................... H03K 5/13
327/276

* cited by examiner

TECHNIQUES FOR ADJUSTING LATENCY OF A CLOCK SIGNAL TO AFFECT SUPPLY VOLTAGE

FIELD OF THE DISCLOSURE

The present disclosure relates to electronic circuits, and more particularly, to techniques for adjusting latency of a clock signal to affect supply voltage.

BACKGROUND

A circuit board system typically has a power distribution network that provides a supply voltage from a voltage regulator module to one or more integrated circuits and/or one or more discrete circuits in the circuit board system. Integrated circuits often operate at data rates and clock signal frequencies that are high enough to generate significant supply voltage noise. Power distribution networks typically include decoupling capacitors that are used to help provide more stable supply voltages. A decoupling capacitor shunts high frequency noise on a direct current (DC) supply voltage line to a ground supply line, thereby reducing the supply voltage noise. A decoupling capacitor acts as a store of charge that provides current to maintain a stable supply voltage during circuit operation.

BRIEF SUMMARY

According to an embodiment, an integrated circuit includes circuit blocks, a clock network coupled to the circuit blocks, and a supply voltage network coupled to the circuit blocks. Each of the circuit blocks comprises at least one clocked circuit that receives a clock signal. The clock network provides the clock signal to the clocked circuits in the circuit blocks. The supply voltage network provides a supply voltage to the circuit blocks. A latency of the clock signal provided through the clock network to at least one of the circuit blocks is adjusted to decrease a peak voltage drop in the supply voltage caused by a peak current drawn by the circuit blocks.

In an embodiment, a method includes determining an estimate of a peak current drawn by circuit blocks in an integrated circuit from a supply voltage on a supply voltage network in the integrated circuit. The method further includes determining an estimate of a peak voltage drop in the supply voltage on the supply voltage network caused by the peak current drawn by the circuit blocks. The method also includes adjusting a latency of a clock signal that is provided through a clock network in the integrated circuit to at least one of the circuit blocks based on the estimate of the peak voltage drop in the supply voltage to affect the supply voltage on the supply voltage network in the integrated circuit.

Embodiments of the present invention can be implemented in numerous ways, such as a process, an apparatus, a system, or a device. Various objects, features, and advantages of the present invention will become apparent upon consideration of the following detailed description and the accompanying drawings.

DETAILED DESCRIPTION

A power distribution network in a circuit system should be designed with a low enough target impedance to meet the specification for the maximum supply voltage ripple allowed during the maximum dynamic current drawn by circuits in the circuit system. Some circuit systems require large decoupling capacitors to achieve the specification for the maximum supply voltage ripple. However, large decoupling capacitors may be costly and may require a significant amount of area in a circuit system.

A sudden increase or decrease in the current drawn by circuits in an integrated circuit (IC) in a circuit system may cause excessive voltage ripple or a large voltage drop in the supply voltage provided through a power distribution network. A sudden change in the current drawn by circuits in an integrated circuit may also cause instability in the voltage regulator module that generates the supply voltage in the circuit system. A relatively large voltage ripple in a supply voltage can cause power supply noise induced jitter. Power supply noise induced jitter may cause functional failures in an IC. The supply voltage may go down, causing gate delays to increase, which leads to setup timing failures, or the supply voltage may go up, causing gate delays to decrease, which leads to hold failures. Rarer failures could include functional failures due to insufficient supply voltage or excessive supply voltage. As another example, power supply noise induced jitter may cause a transceiver to generate a higher bit error rate (BER) in a transmitted or received data signal through increased transmit jitter or reduced jitter tolerance.

According to some embodiments disclosed herein, variations in a supply voltage provided through a supply voltage network within an integrated circuit (IC) are reduced by adjusting the latency of a clock signal. The clock signal is provided through a clock network to circuit blocks in the IC that draw current from the supply voltage network. A delay provided to the clock signal is adjusted based on an analysis of a peak voltage drop in the supply voltage caused by a peak current drawn by the circuit blocks from the supply voltage network. The peak current drawn by the circuit blocks from the supply voltage network is determined, for example, using an estimate of the peak current drawn by the circuit blocks from the supply voltage network.

The target impedance $Z_{TARGET}$ of a power distribution network in a circuit system can be determined using equation (1) below. In equation (1), $V_{CC}$ is the target supply voltage provided by the power distribution network, % Ripple is the percentage variation allowed in the supply voltage $V_{CC}$ by a specification for an IC receiving the supply voltage, and $I_{MDC}$ is the maximum change in the current drawn by circuit blocks in the IC that receive the supply voltage $V_{CC}$.

$$Z_{TARGET} = \left[\frac{V_{CC} \times \frac{\% \text{ Ripple}}{100}}{I_{MDC}}\right] \quad (1)$$

Equation (1) shows that the target impedance $Z_{TARGET}$ of a power distribution network decreases in response to a decrease in the supply voltage $V_{CC}$, in response to a decrease in the % Ripple, or in response to an increase in $I_{MDC}$. Lower target impedances are required in some low power technologies such as dynamic voltage scaling (DVS), because $V_{CC}$ is reduced. However, it is often more challenging and/or expensive to design an IC with a lower $Z_{TARGET}$. According to some embodiments disclosed herein, the target impedance $Z_{TARGET}$ of a power distribution network in a circuit system is increased by reducing the $I_{MDC}$ drawn by one or more circuit blocks in an IC. The $I_{MDC}$ may be reduced to enable an easier board design by increasing $Z_{TARGET}$, to permit a lower supply voltage in an IC, and/or to decrease the percentage variation (i.e. % voltage ripple) in the supply voltage.

Figure 1:
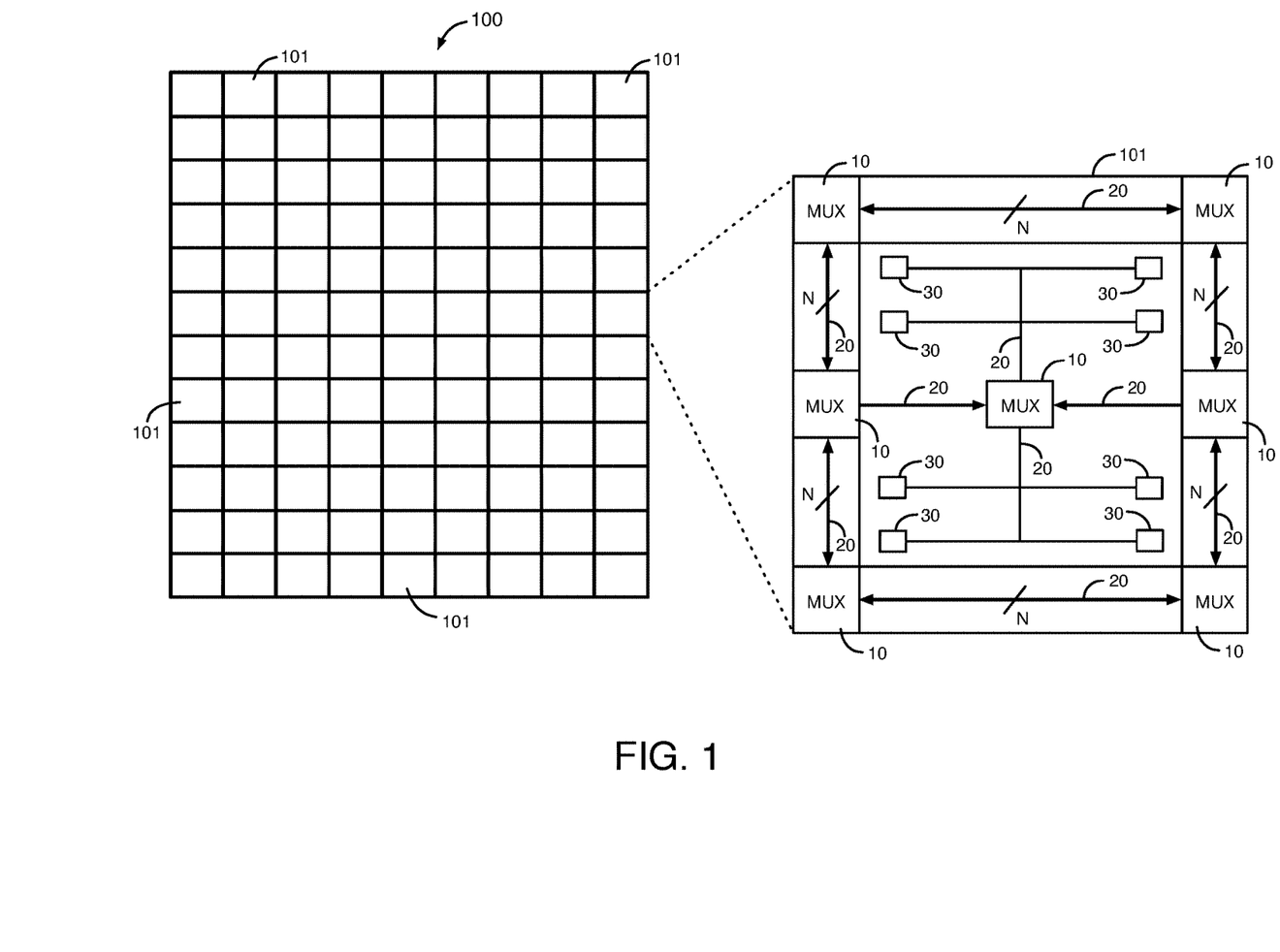
FIG. 1 illustrates an example of an integrated circuit (IC) that includes regions of circuit blocks and a clock network, according to an embodiment.

FIG. 1 illustrates an example of an integrated circuit (IC) 100 that includes regions of circuit blocks and one or more clock networks, according to an embodiment. IC 100 may be any type of integrated circuit, such as a microprocessor, a field programmable gate array (FPGA), a programmable logic device, a memory IC, etc. IC 100 of FIG. 1 includes several regions 101 of circuit blocks that are arranged in a grid of rows and columns. IC 100 includes one or more clock networks that transmit clock signals. Each of the regions 101 includes a portion of one or more of the clock networks. Each of the clock networks includes routing wires, buffers, and multiplexer circuits. Each of the clock networks is coupled to circuit blocks within one, a subset of, or all of the regions 101.

Each of the regions 101 may include several circuit blocks. Further details of one of the regions 101 are shown on the right side of FIG. 1. According to various embodiments, each of the regions 101 in IC 100 or a subset of the regions 101 in IC 100 may have the structure shown in FIG. 1. As shown in FIG. 1, each region 101 includes multiplexer (MUX) circuits 10, routing wires 20, and circuit blocks 30.

A circuit block 30 is circuitry in a particular region of an IC that may include one or more clocked circuits. A clocked circuit is a circuit that receives a clock signal. A circuit block may also include circuits that do not receive clock signals. The circuit blocks 30 may include, for example, combinatorial logic circuits, sequential logic circuits, and/or memory circuits. The combinatorial logic circuits may include, for example, logic gate circuits, lookup table circuits, circuits that perform arithmetic functions, etc. The sequential logic circuits may include, for example, flip-flop circuits. The memory circuits may include, for example, random access memory circuits, read only memory circuits, non-volatile memory circuits, etc. Examples of circuit blocks 30 in a field programmable gate array (FPGA) IC include programmable logic circuits, digital signal processing (DSP) circuits, and random access memory circuits.

Each region 101 may include additional multiplexers, buffers, routing wires, and circuit blocks that are not shown in FIG. 1. The clock networks in each region 101 include the multiplexer circuits 10 and the routing wires 20. The multiplexer circuits 10 and routing wires 20 are used to route clock signals through the clock networks to the circuit blocks 30. The routing wires 20 route clock signals between the multiplexer circuits 10. Multiplexer circuits 10 are programmable (i.e., configurable) to create customized clock paths through routing wires 20 to selected ones of the circuit blocks 30.

The routing wires 20 around the edges of the region 101 are arranged in buses. Each of the buses includes an N number of parallel routing wires 20 (e.g., 32) coupled between adjacent multiplexer circuits 10, where N is any integer greater than 1. The clock networks of region 101 are programmable clock networks, because multiplexer circuits 10 can be programmed to create customized clock paths through the IC 100 to the circuit blocks 30. The techniques disclosed herein may be applied to clock networks that have at least some programmable features allowing additional latencies to be added to the clock signals. The techniques disclosed herein may reduce the $I_{MDC}$, which in turn can be used to 1) enable an easier board design by increasing $Z_{TARGET}$, 2) permit lower voltages in an IC (i.e. a lower supply voltage), or 3) decrease the percentage variation (i.e. % voltage ripple) in the supply voltage. Alternatively, the reduction in $I_{MDC}$ can cause all 3 of these design objectives to be met, subject to the relationship described by equation (1).

An estimate of a peak voltage drop in the supply voltage provided to the circuit blocks in an integrated circuit (IC) can be determined, for example, using an estimate of the peak power drawn by the circuit blocks in each period (i.e., each clock cycle) of a clock signal provided to the circuit blocks. An estimate of the peak power drawn by the circuit blocks in each period of the clock signal may be calculated using a circuit block specific steady state dynamic power model.

The circuit block specific steady state dynamic power model may be used to determine an average dynamic power consumed by a circuit block over a long period of time relative to the period of the clock signal. The average dynamic power consumed may be calculated as the energy consumed per transition $E_T$ as a function of the circuit block type and the toggle rate percentage R. The average dynamic power consumed $P_{AVG}$ by a circuit block may be calculated using equation (2) below. In equation (2), $E_T$ is the energy consumed by a circuit block during one transition of an input signal to the circuit block. Input signals to the circuit blocks can be data signals, control signals, clock signals, etc. $F_{CLK}$ is the frequency of the clock signal, and R is the toggle rate percentage of the circuit block. A clock signal by definition has a toggle rate percentage R of 200% (i.e., 2 transitions per clock cycle).

$$P_{AVG} = E_T \times F_{CLK} \times R \quad (2)$$

The frequency $F_{CLK}$ of the clock signal and the toggle rate percentage R may be user specific values (e.g., in a programmable IC) or values that are fixed by designers of the IC (e.g., in an application specific IC). The instantaneous current duration of the circuit block may also be determined in addition to the determination of the dynamic average power consumed by the circuit block. Alternatively, circuit block specific default values can be used for the instantaneous current duration.

The average dynamic power consumed $P_{AVG}$ by a circuit block can be used to determine a peak current profile of the circuit block based on an average toggle rate percentage R of that circuit block. The toggle rate percentage R can be estimated using a vectorless technique without user input. Alternatively, the toggle rate percentage R can be estimated using a user provided value change dump (VCD). A VCD may be generated by performing logical simulation of a user's design for an IC using simulation software tools, such as ModelSim.

Figure 2:
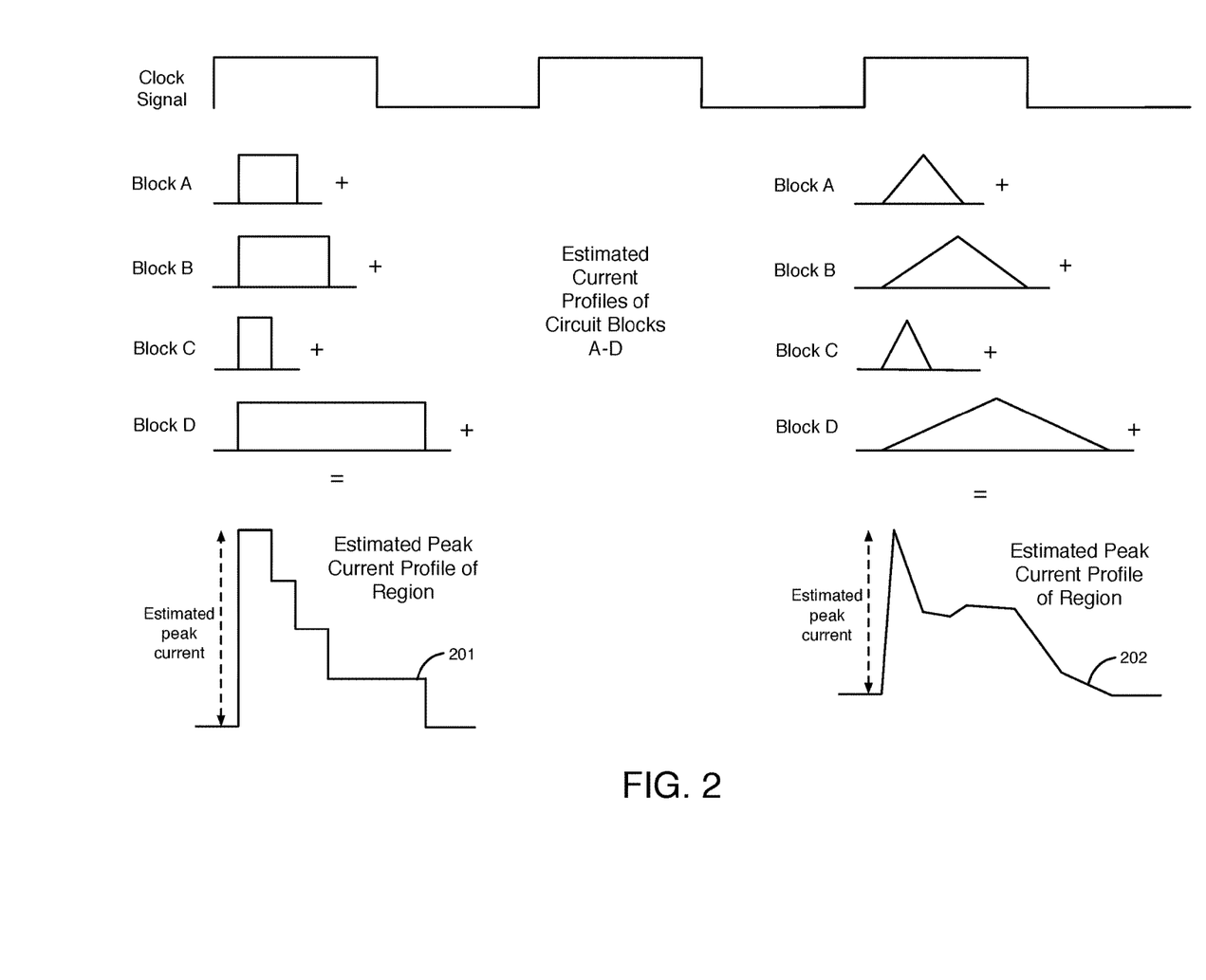
FIG. 2 illustrates examples of estimates of peak current profiles for circuit blocks in a region of an integrated circuit, according to various embodiments.

FIG. 2 illustrates examples of estimates of peak current profiles for circuit blocks in a region of an integrated circuit, according to various embodiments. A waveform of an exemplary clock signal is shown at the top of FIG. 2. FIG. 2 also shows estimated current profiles for four circuit blocks A, B, C, and D using two different techniques. Each of the circuit blocks A-D may include any number of individual circuits. Four square waveforms for the estimated current profiles of circuit blocks A-D using a first technique are shown on the left side of FIG. 2. The first technique assumes that the current drawn from the supply voltage in each circuit block increases to a maximum current instantaneously after the rising edge of the clock signal, and then after a period of time, the current instantaneously returns to zero. The area under each of these four square waveforms equals the energy consumed by the circuit block from the average dynamic power model discussed above. In FIG. 2, only four circuit blocks A-D are in an exemplary region 101. However, in other embodiments, a region 101 may include any number of circuit blocks, e.g., hundreds or thousands of circuit blocks. The sum of the four square waveforms of the estimated current profiles for blocks A-D is shown on the bottom left of FIG. 2 as waveform 201. Waveform 201 represents the estimated peak current profile of the region. The estimated peak current of the region using the first technique is shown in FIG. 2 as the maximum value of waveform 201.

Four triangular waveforms for the estimated current profiles of circuit blocks A-D using a second technique are shown on the right side of FIG. 2. The second technique assumes that the current drawn from the supply voltage in each circuit block increases linearly to a maximum current after the rising edge of the clock signal, and then after reaching the maximum current, the current linearly ramps back to zero. The area under each of these four triangular waveforms equals the energy consumed by the circuit block from the average dynamic power model discussed above. The sum of the four triangular waveforms of the estimated current profiles for blocks A-D is shown on the bottom right of FIG. 2 as waveform 202. Waveform 202 represents the estimated peak current profile of the region. The estimated peak current of the region using the second technique is shown in FIG. 2 as the maximum value of waveform 202. The second technique may represent a less pessimistic peak current model than the first technique.

Figure 3:
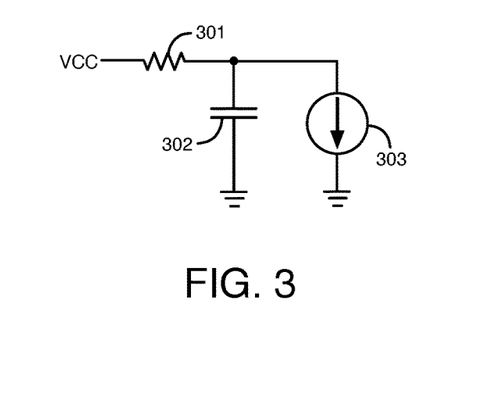
FIG. 3 illustrates an example of a lumped resistor-capacitor (RC) model that can be used to calculate the estimated current profile of circuit blocks in an integrated circuit, according to an embodiment.

FIG. 3 illustrates an example of a lumped resistor-capacitor (RC) model that can be used to calculate the estimated current profile of circuit blocks in an integrated circuit, according to an embodiment. In the lumped RC model of FIG. 3, the supply voltage network within an integrated circuit (IC) is modeled as a circuit that includes a resistor 301 and a capacitor 302 that are coupled as a low pass RC filter as shown in FIG. 3. The circuit blocks that draw current from the supply voltage network are modeled as a current sink circuit 303 that is coupled to the resistor 301 and the capacitor 302 as shown in FIG. 3. The waveform 202 shown in FIG. 2 may be generated, for example, using the lumped RC circuit model of FIG. 3. According to various embodiments, the lumped RC model of FIG. 3 may be used to model an entire supply voltage network in an IC or only a portion of a supply voltage network in an IC. The lumped RC model may, for example, be used to model the portion of a supply voltage network in an IC that is located within one region 101 or within a subset of adjacent regions 101 in the IC.

Detailed models that are used to calculate the dynamic average power, the peak current, and the current profile of various circuit blocks in an IC may require a significant amount of runtime (i.e., compile time) to execute. In some instances, detailed models of these parameters may be runtime prohibitive to execute. As an alternative, a simplified heuristic based peak supply voltage drop model can be used instead of a more detailed model to determine the dynamic average power, the peak current, the current profile, and other parameters of circuit blocks in the IC that affect the supply voltage. A simplified heuristic based peak supply voltage drop model may, for example, be extracted by running a detailed model on a large number of benchmark designs for the IC. Inputs to the simplified heuristic based peak supply voltage drop model may include circuit blocks in particular regions of the IC, such as programmable logic circuit blocks, digital signal processing (DSPs) circuits, and/or memory circuits, to name a few examples. Inputs to the simplified heuristic based peak supply voltage drop model may also or alternatively include user level circuit blocks that span two or more regions in the IC. The toggle rate percentage of the circuit blocks can be estimated using a vectorless technique or from a user provided simulation of the circuit blocks. The output of the simplified heuristic based peak supply voltage drop model is an estimate of the peak voltage drop of the supply voltage on the supply voltage network for each region in the IC. The simplified heuristic based peak supply voltage drop model is faster than a more detailed model, but may be less accurate than a more detailed model.

Figure 4:
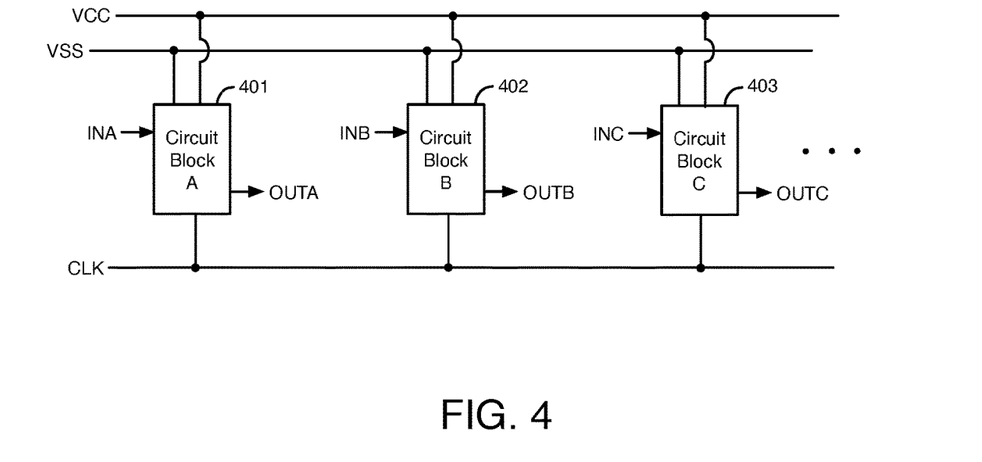
FIG. 4 illustrates examples of circuit blocks in an integrated circuit that receive a supply voltage through a supply voltage network and a clock signal through a clock network, according to an embodiment.

FIG. 4 illustrates examples of circuit blocks in an integrated circuit that receive a supply voltage through a supply voltage network and a clock signal through a clock network, according to an embodiment. A supply voltage VCC is provided through a supply voltage network in an integrated circuit (IC) to each of circuit blocks 401, 402, and 403 in the IC, as shown in FIG. 4. A ground voltage VSS is also provided to each of circuit blocks 401, 402, and 403 through a ground voltage network in the IC, as shown in FIG. 4. The supply voltage VCC and the ground voltage VSS may be provided to numerous other circuit blocks in the integrated circuit. A periodic clock signal CLK is provided through a clock network in the IC to a clock input of each of circuit blocks 401, 402, and 403, as shown in FIG. 4. Each of the circuit blocks 401-403 is responsive to clock signal CLK. Circuit blocks 401-403 may be examples of the circuit blocks 30 shown in FIG. 1. Circuit blocks 401-403 may include any of the circuits described above for circuit blocks 30, including for example, programmable logic circuits, DSP circuits, memory circuits, logic gate circuits, flip-flops, etc. Signals CLK, VCC, and VSS may also be provided to additional circuit blocks in the IC (not shown).

According to an exemplary embodiment, the total voltage drop of a supply voltage (e.g., VCC minus VSS) provided to circuit blocks in regions that receive a clock signal is calculated by adding together the peak voltage drop in the supply voltage in each of the regions that the clock signal is provided to. The clock signal is provided to circuit blocks in one or more regions, as shown, for example, in FIGS. 1 and 4. This embodiment can be used to calculate the voltage drop of the supply voltage for each clock signal in a netlist of an integrated circuit (IC) design. Each of the clock signals in the netlist is provided to circuit blocks in the IC that draw current from the supply voltage network that provides the supply voltage to the circuit blocks. An example of an iterative high level algorithm that implements this embodiment is shown below.

```
For each clock signal in a netlist for an IC design {
    total supply voltage drop=0;
    For each region that the clock signal is provided to {
        //use simplified heuristic based model
        supply voltage drop in region=calculate the peak voltage drop of the supply voltage in that region
        total supply voltage drop+=supply voltage drop in region}
    //repeat loop for each region that receives the clock signal
    if (total supply voltage drop >threshold) then
        introduce latency into clock signal in each region to reduce total supply voltage drop}
//repeat loop for each clock signal in netlist
```

The supply voltage drop is calculated by solving for the voltage drop in the circuit of FIG. 4 for each region. The current sink circuit 303 in FIG. 3 is equal to the current profile for that region. The supply voltage drop in each region can be estimated, for example, as a square wave or as a triangular wave. The square or triangular waveform estimates for the supply voltage drop in each region can be determined using techniques that are similar to the techniques described above with respect to FIG. 2 for determining the estimated peak current profile of a region. Any of the calculations described herein for determining, e.g., the peak current, the average power, or the total supply voltage drop, including the high level algorithm above, may be performed using a controller in IC 100, a computer that includes IC 100, or a computer that does not include IC 100.

Although FIG. 4 only shows one clock signal CLK, in other embodiments, multiple clock signals may be provided to the circuit blocks 401-403, etc. The techniques disclosed herein can be applied to groups of clock signals that are related. For example, the techniques disclosed herein may be applied to clock signals that are phase shifted or to clock signals that have integer multiple frequencies.

According to various embodiments, optimizations are made to one or more clock networks in an integrated circuit (IC) to reduce the voltage drop and/or voltage ripple in a supply voltage caused by circuit blocks that receive the supply voltage and that receive one or more clock signals provided through the one or more clock networks. For example, coarse grained or fine grained optimizations can be made to one or more clock networks in an IC. The coarse grained or fine grained optimizations can be used to adjust the latency of a clock signal to reduce the $I_{MDC}$ drawn by circuit blocks that receive the clock signal, which in turn can be used to 1) enable an easier board design by increasing $Z_{TARGET}$, 2) permit a lower supply voltage, or 3) decrease the percentage variation (i.e. % voltage ripple) in the supply voltage. Alternatively, the reduction in $I_{MDC}$ can be used to provide a combination of these 3 design objectives, subject to the relationship described by equation (1).

According to examples of coarse grained optimizations, the timing (e.g., the latencies) of clock signals in entire clock networks can be adjusted to reduce the voltage drop/ripple of the supply voltage during the process of planning and placement of the circuit blocks within the floor plan of the IC. According to an example of a fine grained optimization, the latency of one or more clock signals can be adjusted for one or more regions of circuit blocks after the circuit blocks have been placed and routed in the IC. Adjusting the latency of a clock signal after the circuit blocks in the IC have been placed and routed may introduce hold failures at various clocked circuits that receive the clock signal. These hold failures can be fixed using a post-route algorithm that identifies and eliminates any hold failures caused by these clock signal timing adjustments.

The latency of a clock signal refers to the amount of time for an edge in the clock signal to travel from the clock origin through a clock network to a destination circuit that receives the clock signal. According to some embodiments, the latencies of clock signals provided through clock networks can be adjusted to reduce the voltage drop and/or voltage ripple of a supply voltage. For example, a clock network can be pre-routed along multiple possible paths to facilitate changes in the latency of the clock signal provided through the clock network to reduce the supply voltage drop. As another example, an adjustable delay circuit can be placed in a clock network. The delay of the adjustable delay circuit can be adjusted to change the latency of a clock signal provided through the clock network to reduce the supply voltage drop.

Adjusting the latency of a clock signal can reduce the supply voltage drop by reducing the peak current drawn by the circuit blocks that receive the clock signal and the supply voltage. For example, if several clocked circuits within circuit blocks in an IC generate transitions in their output signals at the same time in response to a clock signal, these clocked circuits together may draw a large amount of current at the same time that causes a significant voltage drop in the supply voltage. The latencies of one or more clock signals provided to the clocked circuits can be adjusted to cause different subsets of the clocked circuits to generate transitions in their output signals at different times, rather than at the same time, to reduce the peak current drawn by these clocked circuits. By adjusting the timing of clock signals in an IC to reduce the peak current drawn by circuit blocks receiving the clock signals, the peak voltage drop and/or voltage ripple of the supply voltage provided to these circuit blocks can be significantly reduced.

Figure 5:
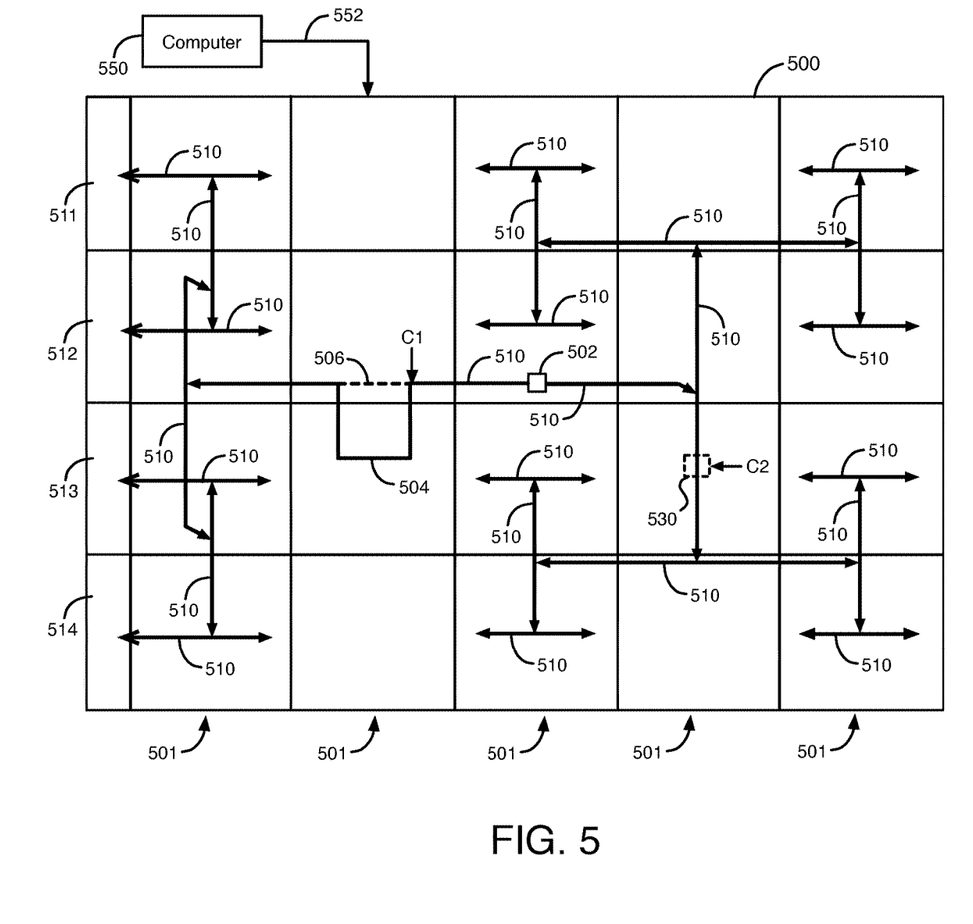
FIG. 5 illustrates an example of a clock network in an integrated circuit (IC), according to an embodiment.

FIG. 5 illustrates an example of a clock network in an integrated circuit (IC) 500, according to an embodiment. IC 500 includes 20 regions 501 of circuit blocks arranged in 5 columns. The 20 regions 501 are shown in FIG. 5 merely as an example. ICs containing embodiments of the present invention can have any number of regions and circuit blocks. IC 500 may be, for example, IC 100 or a different IC. The clock network includes routing wires 510 that are laid out in IC 500 to provide one or more clock signals to circuit blocks in regions 501. The clock network may include additional routing wires that are not shown in FIG. 5. The clock network of FIG. 5 also includes one or more adjustable delay circuits that can adjust the latency of one or more clock signals provided through the clock network, as described below. In exemplary embodiments in which IC 500 is a programmable IC, the clock network is a programmable clock network that includes clock buffer circuits and multiplexer circuits spaced throughout the clock network that are programmable to provide programmable routing paths in the clock network, as shown, e.g., in FIG. 1.

A clock signal provided through the clock network of FIG. 5 originates at a clock source 502, which may be, for example, a phase-locked loop (PLL) or a delay-locked loop (DLL). As another example, a clock signal may be routed from a PLL or a DLL to clock source 502 through routing wires. The clock signal is provided from clock source 502 through the routing wires 510 in the clock network to destination circuit blocks within the regions 501. The multiplexer and/or buffer circuits in the clock network route the clock signal to the circuit blocks selected to receive the clock signal in the IC design.

The latency of the clock signal provided through the clock network of FIG. 5 can be adjusted to reduce the $I_{MDC}$ drawn by circuit blocks that receive the clock signal. The adjustment to the latency of the clock signal can be used to 1) enable an easier board design by increasing $Z_{TARGET}$, 2) allow the IC to have a lower supply voltage, or 3) decrease the percentage variation (i.e. % voltage ripple) in the supply voltage. For example, the clock network of FIG. 5 has two (or more) alternate paths 504 and 506 that facilitate changes in the latency of the clock signal provided to circuit blocks 511, 512, 513, and 514. Circuit blocks 511-514 may be, for example, input/output circuits that include transceivers. Each of the paths 504 and 506 includes routing wires that can route a clock signal from clock source 502 to circuit blocks on the left side of IC 500. A control signal C1 provided to the clock network determines whether the clock network provides the clock signal from clock source 502 through the routing wires in path 504 or through the routing wires in path 506 to the circuit blocks 511-514, etc.

The control signal C1 is adjusted to cause the clock network to select a different one of paths 504 or 506 to route the clock signal from clock source 502 to circuit blocks on the left side of IC 500, such as circuit blocks 511, 512, 513, and 514. If, for example, circuit blocks 511-514 are drawing peak current from the supply voltage at the same times that circuit blocks in regions 501 are drawing peak current from the supply voltage, the peak currents drawn from the supply voltage may be large enough to cause a large voltage drop in the supply voltage. According to this example, the clock network routes the clock signal from clock source 502 through path 504, instead of through path 506, to circuit blocks coupled to the left part of the clock network (e.g., circuit blocks 511-514).

Routing the clock signal through path 504 instead of through path 506 increases the latency of the clock signal as received at the circuit blocks coupled to the left part of the clock network (e.g., circuit blocks 511-514) to cause these circuit blocks to draw peak current from the supply voltage at different times than when the circuit blocks coupled to the right part of the clock network are drawing peak current from the supply voltage. Causing the circuit blocks coupled to the left and right parts of the clock network to draw peak current from the supply voltage at different times reduces the peak voltage drop in the supply voltage. The adjustment to the clock signal latency caused by routing the clock signal through path 504 instead of path 506 may be less than a period of the clock signal. According to further embodiments, the clock network of IC 500 may have additional alternate paths in other parts of the clock network that can be used to provide adjustable latencies to the clock signal received in other regions of the circuit blocks. For example, IC 500 may have multiple clock paths to every circuit element in the IC. In some embodiments, the clock network of IC 500 may have alternate paths at the clock source 502 that affect the clock signal latency throughout the clock network.

The clock network shown in FIG. 5 in IC 500 also includes an adjustable delay circuit 530. The adjustable delay circuit 530 delays the clock signal provided through the clock network to circuit blocks coupled to the lower right portion of the clock network. The delay of adjustable delay circuit 530 is controlled by a set of control signals C2. If the circuit blocks that receive the clock signal from the right portion of the clock network are drawing peak current from the supply voltage at the same time, the peak current drawn from the supply voltage may be large enough to cause a large voltage drop in the supply voltage. According to an embodiment, the delay of adjustable delay circuit 530 can be adjusted to increase or decrease the latency of the clock signal provided through the clock network to the circuit blocks coupled to the lower right portion of the clock network. The delay of adjustable delay circuit 530 is adjusted to cause the circuit blocks coupled to the lower right portion of the clock network to draw peak current from the supply voltage at different times than when the circuit blocks coupled to the upper right portion of the clock network draw peak current from the supply voltage. Causing the circuit blocks coupled to the upper right and lower right portions of the clock network to draw peak current from the supply voltage at different times reduces the peak voltage drop in the supply voltage. According to further embodiments, IC 500 may have additional adjustable delay circuits that are coupled to other parts of the clock network and that provide adjustable latencies to the clock signals received in other regions of the circuit clocks in the IC. In some embodiments, the clock network of IC 500 has an adjustable delay circuit at the clock source 502 that affects the clock signal latency throughout the clock network.

In some embodiments, a computer 550 determines the estimate of the peak current drawn by the circuit blocks in IC 500 from the supply voltage, determines the estimate of the peak voltage drop in the supply voltage caused by the peak current drawn by the circuit blocks, and causes the adjustment to the latency of the clock signal provided through the clock network. Computer 550 may also determine an average dynamic power consumed by the circuit blocks as described above. Computer 550 communicates with IC 500 through bus 552. Computer 550 may include a computer-readable non-transitory storage medium for storing computer readable instructions.

Some of the regions 501 in IC 500 may have less robust portions of the power supply network than other regions 501. For example, the power supply network in IC 500 may not be symmetrical. Some regions 501 (e.g., near the corners of IC 500) may be farther away from a pin that receives the supply voltage VCC than other regions 501. The regions that are farther away from the supply voltage pin may be more susceptible to spikes or drops in the supply voltage. According to some embodiments, the robustness of portions of a supply voltage network that are within a subset of the regions of circuit blocks in an IC is taken into account during the routing of the clock network. Adjustments may be made to the latency of a clock signal provided to regions that are more susceptible to variations in the supply voltage to reduce the peak current drawn by the circuit blocks in these regions to less than the maximum target peak currents for other regions in the IC.

Figure 6:
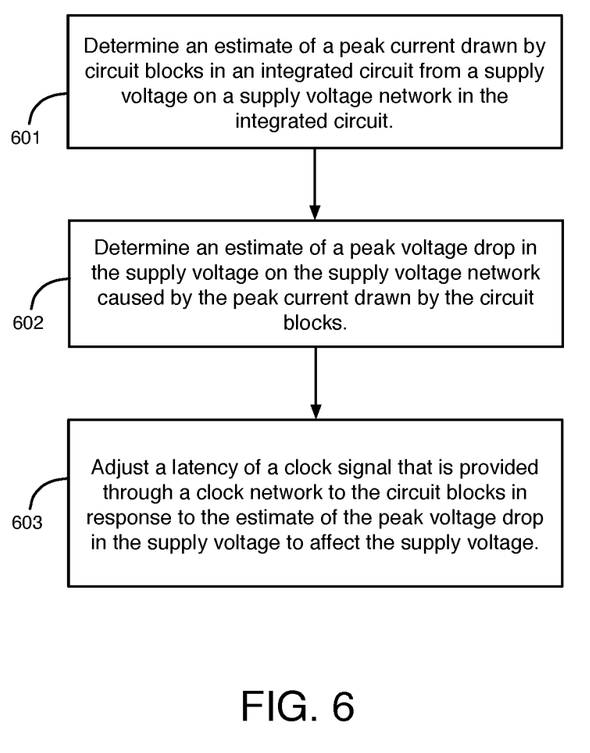
FIG. 6 illustrates examples of operations that may be performed to reduce the voltage drop in a supply voltage provided through a supply voltage network in an integrated circuit, according to an embodiment.

FIG. 6 illustrates examples of operations that may be performed to reduce the voltage drop in a supply voltage provided through a supply voltage network in an integrated circuit, according to an embodiment. In operation 601, an estimate of a peak current drawn by circuit blocks in an integrated circuit from a supply voltage on a supply voltage network in the integrated circuit is determined using, for example, the techniques disclosed herein. In operation 602, an estimate of a peak voltage drop in the supply voltage on the supply voltage network caused by the peak current drawn by the circuit blocks is determined using, for example, the techniques disclosed herein. In operation 603, a latency of a clock signal that is provided through a clock network to the circuit blocks is adjusted in response to the estimate of the peak voltage drop in the supply voltage to affect the supply voltage. The operations of FIG. 6 may, for example, be performed by circuitry in IC 500, by computer 550, or by a combination thereof.

The methods and apparatuses described herein may be incorporated into any suitable electronic device or system of electronic devices. For example, the methods and apparatuses may be incorporated into numerous types of devices, such as programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), microprocessors, and graphics processing units (GPUs).

The integrated circuits described herein may be part of a data processing system that includes one or more of the following components; a processor; memory; input/output circuitry; and peripheral devices. The integrated circuits can be used in a wide variety of applications, such as computer networking, data networking, instrumentation, video processing, digital signal processing, or any suitable other application.

Embodiments of the present invention can, for example, be implemented using one or a combination of hardware, software, and a computer-readable medium containing program instructions. Embodiments of the present invention can be embodied as program code stored on a non-transitory computer readable medium that can be run on a computer or in an IC. Software implementing embodiments of the present invention can be stored on a non-transitory computer-readable medium such as semiconductor memory, hard disk drive, compact disc (CD), digital video disc (DVD), or other media. Embodiments of the present invention may also be embodied as a computer readable program code unit stored on a non-transitory computer readable medium.

Although the method operations were described in a specific order, it should be understood that other operations may be performed in between described operations, described operations may be adjusted so that they occur at slightly different times or in a different order, or described operations may be distributed in a system that allows the occurrence of the operations at various intervals associated with the processing.

The foregoing description of the exemplary embodiments of the present invention is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A method comprising:
    determining an estimate of a peak current drawn by circuit blocks in an integrated circuit from a supply voltage on a supply voltage network in the integrated circuit, wherein determining the estimate of the peak current drawn by the circuit blocks further comprises determining estimates of peak current profiles for the circuit blocks by determining an average dynamic power consumed by each of the circuit blocks based on an average toggle rate percentage of each of the circuit blocks;
    determining an estimate of a peak voltage drop in the supply voltage on the supply voltage network caused by the peak current drawn by the circuit blocks; and
    adjusting a latency of a clock signal that is provided through a clock network in the integrated circuit to at least one of the circuit blocks based on the estimate of the peak voltage drop in the supply voltage to affect the supply voltage on the supply voltage network in the integrated circuit.

2. The method of claim 1, wherein adjusting the latency of the clock signal causes a first subset of the circuit blocks coupled to the clock network to draw peak current from the supply voltage at different times than when a second subset of the circuit blocks coupled to the clock network draw peak current from the supply voltage to reduce the peak voltage drop in the supply voltage.

3. The method of claim 1, wherein adjusting the latency of the clock signal further comprises:
    selecting a different one of multiple paths in the clock network, wherein the multiple paths in the clock network have different lengths of routing wires; and
    routing the clock signal through routing wires in the different one of the multiple paths in the clock network to adjust the latency of the clock signal.

4. The method of claim 1, wherein adjusting the latency of the clock signal further comprises adjusting a delay of an adjustable delay circuit coupled in the clock network to adjust the latency of the clock signal.

5. The method of claim 1, wherein adjusting the latency of the clock signal further comprises:
    adjusting a first latency of the clock signal that is provided through a first portion of the clock network to a first subset of the circuit blocks by a first delay; and
    adjusting a second latency of the clock signal that is provided through a second portion of the clock network to a second subset of the circuit blocks by a second delay that is different than the first delay.

6. The method of claim 1, wherein the circuit blocks comprise programmable logic circuits, digital signal processing circuits, and memory circuits, and wherein the clock network is a programmable clock network comprising multiplexer circuits that are configurable to provide programmable routing paths in the programmable clock network.

7. The method of claim 1, wherein determining the estimate of the peak voltage drop in the supply voltage on the supply voltage network further comprises adding together a peak voltage drop in the supply voltage that occurs in each region in a set of regions in the integrated circuit that the clock signal is provided to, wherein each of the regions in the integrated circuit comprises a subset of the circuit blocks.

8. The method of claim 1, wherein the latency of the clock signal is only adjusted if the estimate of the peak voltage drop in the supply voltage on the supply voltage network is greater than a predefined threshold voltage.

9. An integrated circuit comprising:
    circuit blocks, wherein each of the circuit blocks comprises at least one clocked circuit that receives a clock signal;
    a clock network coupled to the circuit blocks, wherein the clock network provides the clock signal to the clocked circuits in the circuit blocks; and
    a supply voltage network coupled to the circuit blocks, wherein the supply voltage network provides a supply voltage to the circuit blocks,
    wherein the integrated circuit adjusts a latency of the clock signal provided through a portion of the clock network to at least one of the circuit blocks based on an estimate of a peak voltage drop in the supply voltage to decrease the peak voltage drop in the supply voltage caused by a peak current drawn by the circuit blocks, wherein the estimate of the peak voltage drop in the supply voltage on the supply voltage network is determined by adding together a peak voltage drop in the supply voltage that occurs in each region in a set of regions in the integrated circuit that the clock signal is provided to, wherein each of the regions in the integrated circuit comprises a subset of the circuit blocks.

10. The integrated circuit of claim 9, wherein an estimate of the peak current drawn by the circuit blocks from the supply voltage in the supply voltage network is calculated, and wherein the estimate of the peak voltage drop in the supply voltage caused by the peak current drawn by the circuit blocks is determined based on the estimate of the peak current drawn by the circuit blocks.

11. The integrated circuit of claim 9, wherein the portion of the clock network comprises multiple alternate paths having different lengths of routing wires, and wherein the integrated circuit adjusts the latency of the clock signal provided through the portion of the clock network by selecting a different one of the multiple alternate paths.

12. The integrated circuit of claim 9, wherein the portion of the clock network comprises an adjustable delay circuit, and wherein the integrated circuit adjusts the latency of the clock signal provided through the portion of the clock network by adjusting a delay of the adjustable delay circuit.

13. The integrated circuit of claim 9, wherein the integrated circuit adjusts a first latency of the clock signal that is provided through a first portion of the clock network to a first subset of the circuit blocks by a first delay, and wherein the integrated circuit adjusts a second latency of the clock signal that is provided through a second portion of the clock network to a second subset of the circuit blocks by a second delay that is different than the first delay.

14. The integrated circuit of claim 9, wherein the circuit blocks comprise programmable logic circuits, digital signal processing circuits, and memory circuits, and wherein the clock network is a programmable clock network comprising multiplexer circuits that are configurable to provide programmable routing paths in the programmable clock network.

15. A computer-readable non-transitory medium storing executable instructions, the executable instructions comprising:
instructions executable to determine an estimate of a peak current drawn by circuit blocks in an integrated circuit from a supply voltage on a supply voltage network in the integrated circuit, wherein the instructions executable to determine the estimate of the peak current drawn by the circuit blocks in the integrated circuit comprise instructions executable to determine estimates of peak current profiles for the circuit blocks by determining an average dynamic power consumed by each of the circuit blocks based on an average toggle rate percentage of each of the circuit blocks;
instructions executable to determine an estimate of a peak voltage drop in the supply voltage on the supply voltage network caused by the peak current drawn by the circuit blocks; and
instructions executable to adjust a latency of a clock signal that is provided through a clock network in the integrated circuit to at least one of the circuit blocks based on the estimate of the peak voltage drop in the supply voltage to affect the supply voltage on the supply voltage network in the integrated circuit.

16. The computer-readable non-transitory medium of claim 15, wherein the instructions executable to adjust a latency of a clock signal comprise:
instructions executable to adjust the latency of the clock signal to cause a first subset of the circuit blocks coupled to the clock network to draw peak current from the supply voltage at different times than when a second subset of the circuit blocks coupled to the clock network draw peak current from the supply voltage to reduce the peak voltage drop in the supply voltage.

17. The computer-readable non-transitory medium of claim 15, wherein the instructions executable to adjust a latency of a clock signal comprise:
instructions executable to select a different one of multiple paths in the clock network having different lengths of routing wires; and
instructions executable to route the clock signal through routing wires in the different one of the multiple paths in the clock network to adjust the latency of the clock signal.

18. The computer-readable non-transitory medium of claim 15, wherein the instructions executable to adjust a latency of a clock signal comprise:
instructions executable to adjust a delay of an adjustable delay circuit coupled in the clock network to adjust the latency of the clock signal.

19. The computer-readable non-transitory medium of claim 15, wherein the instructions executable to adjust a latency of a clock signal comprise:
instructions executable to adjust a first latency of the clock signal that is provided through a first portion of the clock network to a first subset of the circuit blocks by a first delay; and
instructions executable to adjust a second latency of the clock signal that is provided through a second portion of the clock network to a second subset of the circuit blocks by a second delay that is different than the first delay.

20. The computer-readable non-transitory medium of claim 15, wherein
the circuit blocks comprise programmable logic circuits, digital signal processing circuits, and memory circuits, and wherein the clock network is a programmable clock network comprising multiplexer circuits that are configurable to provide programmable routing paths in the programmable clock network.

* * * * *